(12) United States Patent
Cheng et al.

(10) Patent No.: US 12,197,016 B2
(45) Date of Patent: Jan. 14, 2025

(54) FIBER OPTIC CONNECTOR ASSEMBLIES INCLUDING A BONDING AGENT, ALONG WITH RELATED METHODS

(71) Applicant: CORNING RESEARCH & DEVELOPMENT CORPORATION, Corning, NY (US)

(72) Inventors: Xiaole Cheng, Painted Post, NY (US); Stephan Lvovich Logunov, Corning, NY (US); Dan Trung Nguyen, Painted Post, NY (US)

(73) Assignee: Corning Research & Development Corporation, Corning, NY (US)

(*) Notice: Subject to any disclaimer, the term of this patent is extended or adjusted under 35 U.S.C. 154(b) by 192 days.

(21) Appl. No.: 17/880,106

(22) Filed: Aug. 3, 2022

(65) Prior Publication Data

US 2023/0050084 A1 Feb. 16, 2023

Related U.S. Application Data

(60) Provisional application No. 63/231,442, filed on Aug. 10, 2021.

(51) Int. Cl.
*G02B 6/38* (2006.01)
*B29D 11/00* (2006.01)

(52) U.S. Cl.
CPC ...... *G02B 6/3861* (2013.01); *B29D 11/00673* (2013.01)

(58) Field of Classification Search
CPC .. G02B 6/3861; G02B 6/3885; G02B 6/3869; G02B 6/4292; G02B 6/3889; G02B 6/3846; B29D 11/00673
See application file for complete search history.

(56) References Cited

U.S. PATENT DOCUMENTS 9,690,055 B2 * 6/2017 Wu ..................... B32B 38/0008
2023/0049598 A1 * 2/2023 Cheng .................. G02B 6/3861

FOREIGN PATENT DOCUMENTS

WO WO-0022060 A1 * 4/2000 ............. C09J 11/06
WO 2020/145011 A1 7/2020

* cited by examiner

*Primary Examiner* — Vishal I Patel

(57) ABSTRACT

Generally, disclosed herein are various embodiments of bonding agents for use in adhering optical fibers to ferrules within optical connectors, and the methods for use thereof. The various embodiments of bonding agents described herein may provide desirable properties, such as, but not limited to, high adhesion strength and/or improved performance following environmental aging. Various embodiments of the bonding agents disclosed herein may also have other desirable properties for the process of securing an optical fiber within a ferrule, such as, but not limited to, shortened process cycle time. Embodiments herein address these needs by monitoring the change in refractive index of a photocurable bonding agent at the interface between the photocurable bonding agent and a substrate or optical fiber, which is referred to as "back reflectance." In particular, the methods described herein utilize back reflectance techniques to cure the photocurable material or bonding agent.

21 Claims, 10 Drawing Sheets

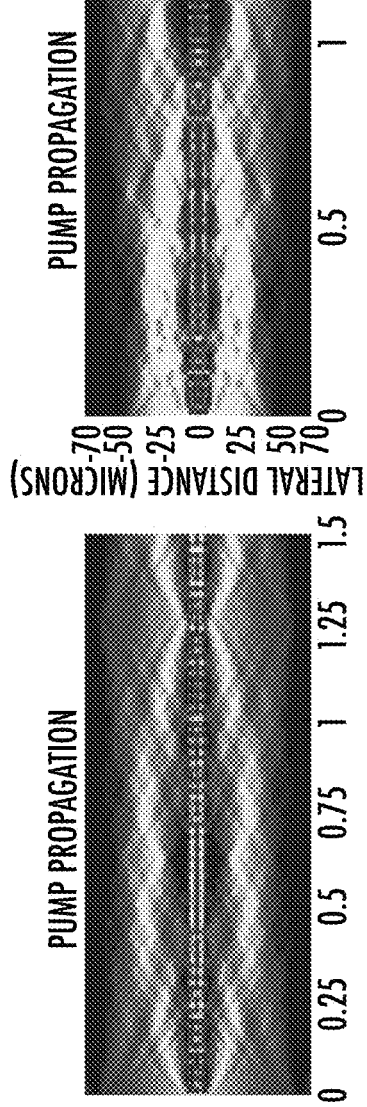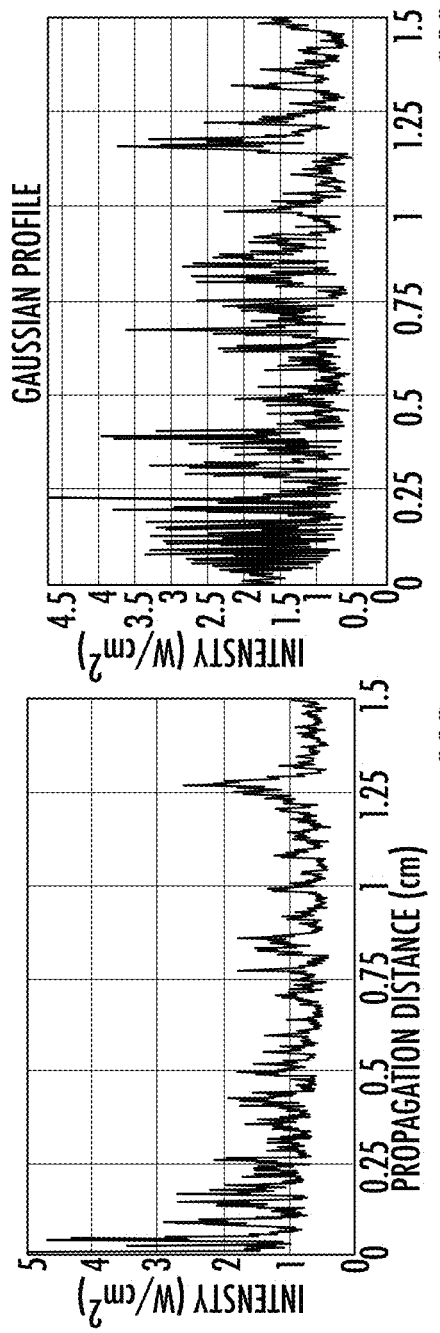

FIBER OPTIC CONNECTOR ASSEMBLIES INCLUDING A BONDING AGENT, ALONG WITH RELATED METHODS

PRIORITY APPLICATION

This application claims the benefit of priority of U.S. Provisional Application No. 63/231,442, filed on Aug. 10, 2021, the content of which is relied upon and incorporated herein by reference in its entirety.

FIELD OF THE DISCLOSURE

This disclosure relates generally to optical connectivity, and more particularly, to fiber optic connector assemblies having a ferrule and bonding agent disposed in the ferrule, along with methods of making such assemblies and the bonding agents used therein.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s), which are secured within a bore of the ferrule using an adhesive or a bonding agent. In particular, in the assembly of optical connectors, adhesives may be used to bond optical fibers to ferrules. The adhesives may typically be thermoset resins, such as epoxies. Present adhesives can require high temperature processing when assembling optical fiber connector assemblies which can in turn increase cycle time or damage other part of the optical fiber connector assemblies during this time. As such, there is a need for a bonding agent with enhanced bonding properties and thermal properties to improve the mechanical properties and the cycle time of the optical fiber cable assemblies in which the bonding agent is present.

SUMMARY OF THE DISCLOSURE

Generally, disclosed herein are various embodiments of bonding agents for use in adhering optical fibers to ferrules within optical connectors, and the methods for use thereof. The various embodiments of bonding agents described herein may provide desirable properties, such as, but not limited to, high adhesion strength and/or improved performance following environmental aging. Various embodiments of the bonding agents disclosed herein may also have other desirable properties for the process of securing an optical fiber within a ferrule, such as, but not limited to, shortened process cycle time. Embodiments herein address these needs by monitoring the change in refractive index of a photocurable bonding agent at the interface between the photocurable bonding agent and a substrate or optical fiber, which is referred to as "back reflectance." In particular, the methods described herein utilize back reflectance techniques to cure the photocurable material or bonding agent.

In one embodiment, a method of assembling an optical fiber assembly, wherein the optical fiber assembly includes a ferrule having a front end, a rear end, and a ferrule bore extending between the front and rear ends is provided. The method comprising: disposing a bonding agent into the ferrule; wherein the bonding agent has a viscosity ranging between 100 cP and 10000 cP at a temperature of about 25° C. and a reference curing time of less than 1 minute; inserting an optical fiber into the ferrule bore and through the bonding agent; and emitting a light onto the optical fiber, wherein emitting the light causes between 75% and 85% of the bonding agent in the ferrule to cure and thereby form the optical fiber assembly.

In another embodiment, the method further comprising heating at least a portion of the ferrule to at least 60° C. while the bonding agent is in the ferrule bore, wherein the heating step comprises heating an entire length of the ferrule. In another embodiment, the heating step is conducted simultaneously with the emitting step. In another embodiment, the emitting step causes the between 75% and 85% of the bonding agent to cure in about 5 seconds or less. In another embodiment, the emitting step includes using a laser emitting a beam at a power ranging between 100 mW and 1000 mW and a wavelength of ranging between 300 nm and 450 nm. In another embodiment, the emitting step includes using a laser apparatus to emit a beam, the laser apparatus comprising: a laser having a power output ranging between 100 mW and 1000 mW and a wavelength ranging between 300 nm and 450 nm; a plurality of lenses directing the beam emitted by the laser onto the optical fiber inserted into the ferrule; and a heating sleeve applied onto the ferrule to perform the heating step. In another embodiment, the laser apparatus further includes a glass stopper spaced apart from an end face of the ferrule by a spacing distance ranging between 0.1 mm and 2 mm. In another embodiment, the optical fiber assembly has a mean insertion loss of less than or equal to 0.25 dB at a reference wavelength of 1310 nm. In another embodiment, the optical fiber assembly has a pull force of at least 4 N. In another embodiment, the optical fiber comprises a cladding having a refractive index, wherein the bonding agent has a refractive index; wherein a difference between the refractive index of the bonding agent and the refractive index of the cladding is between 0.04 and 0.12. In another embodiment, the difference between the refractive index of the bonding agent and the refractive index of the cladding is between 0.04 and 0.10.

In one embodiment, an optical fiber assembly is provided. The optical fiber assembly formed by: disposing a bonding agent in a ferrule bore of a ferrule, wherein the bonding agent has a viscosity ranging between 100 cP and 10000 cP at a temperature of about 25° C.; inserting an optical fiber into the ferrule bore and through the bonding agent; emitting a light onto the optical fiber; and heating at least a portion of the ferrule to at least 60° C. while the bonding agent is in the ferrule bore; wherein the heating step and the emitting step cause at least 80% of the bonding agent that is in the ferrule to cure in a curing time of less than 1 minute and thereby secure the optical fiber to the ferrule.

In another embodiment, the heating step is conducted simultaneously with the emitting step. In another embodiment, the emitting step causes the at least 80% of the bonding agent to cure in about 5 seconds. In another embodiment, the emitting step includes using a laser emitting a beam, the laser having a power ranging between 100 mW and 1000 mW and a wavelength of ranging between 300 nm and 450 nm. In another embodiment, the emitting step includes using a laser apparatus to emit a beam, the laser apparatus comprising: a laser having a power output ranging between 100 mW and 1000 mW and a wavelength ranging between 300 nm and 450 nm; a plurality of lenses directing the beam emitted by the laser onto the optical fiber inserted into the ferrule; and a heating sleeve applied onto the ferrule to perform the heating step. In another embodiment, the laser apparatus further includes a glass stopper spaced apart from an end face of the ferrule by a spacing distance ranging between 0.1 mm and 2 mm. In another embodiment, the optical fiber assembly has a mean insertion loss of less than or equal to 0.25 dB at a reference wavelength of 1310 nm. In another embodiment, the optical fiber assembly has a pull force of at least 4 N. In another embodiment, the optical fiber comprises a cladding having a refractive index, wherein the bonding agent has a refractive index; wherein a difference between the refractive index of the bonding agent and the refractive index of the cladding is between 0.04 and 0.12. In another embodiment, the difference between the refractive index of the bonding agent and the refractive index of the cladding is between 0.04 and 0.10.

In one embodiment, a laser assembly configured to cure a bonding agent within a ferrule bore of a ferrule, the ferrule bore having an optical fiber inserted into the ferrule bore and through the bonding agent is provided. The laser assembly comprising: a laser having a power output ranging between 100 mW and 1000 mW and a wavelength ranging between 300 nm and 450 nm; a plurality of lenses configured to direct a laser beam emitted by the laser onto the optical fiber inserted into the ferrule; and a heating sleeve configured to be applied onto the ferrule to increase the temperature of the ferrule to at least 60° C.; a glass stopper configured to be positioned between the plurality of lenses and the optical fiber, wherein the glass stopper is spaced apart from an end face of the ferrule by a spacing distance ranging between 0.1 mm and 2 mm.

Additional features will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

FIGS. 12A-12D relate to the Example and show simulations of a beam emitted by the laser apparatus of FIG. 8 and onto an optical fiber.

DETAILED DESCRIPTION

Figure 1:
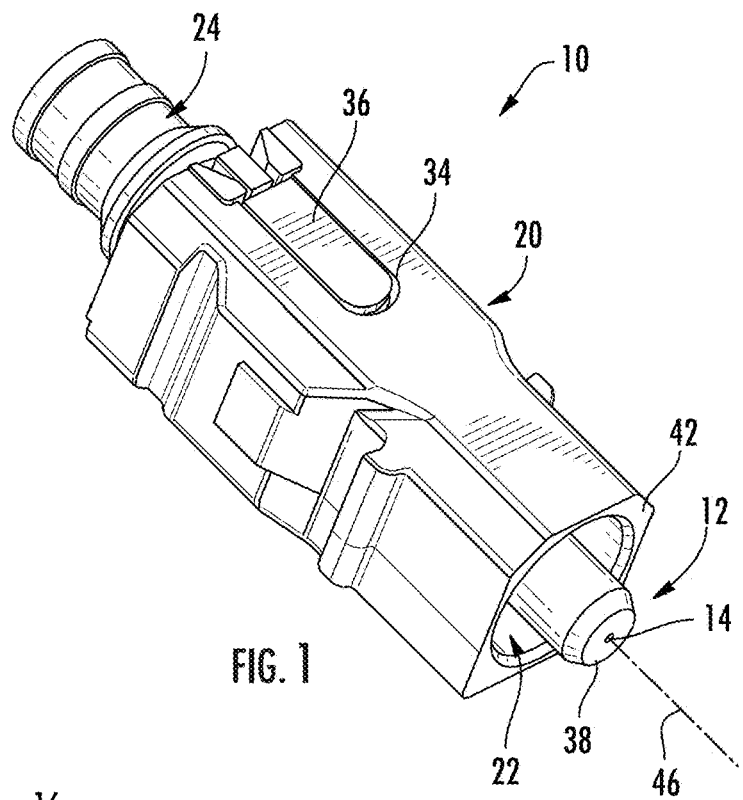
FIG. 1 a perspective view of a fiber optic connector.

Various embodiments will be further clarified by examples in the description below. Generally, disclosed herein are various embodiments of bonding agents for use in adhering optical fibers to ferrules within optical connectors, and the methods for use thereof. The various embodiments of bonding agents described herein may provide desirable properties, such as, but not limited to, high adhesion strength and/or improved performance following environmental aging. Various embodiments of the bonding agents disclosed herein may also have other desirable properties for the process of securing an optical fiber within a ferrule, such as, but not limited to, shortened process cycle time. Embodiments herein address these needs by monitoring the change in refractive index of a photocurable bonding agent at the interface between the photocurable bonding agent and a substrate or optical fiber, which is referred to as "back reflectance." In particular, the methods described herein utilize back reflectance techniques to cure the photocurable material or bonding agent.

The present disclosure also relates to optical fiber assemblies and methods of making the same. The optical fiber assemblies and methods may facilitate the cable assembly process for a fiber optic cable. That is, the optical fiber assemblies and methods may be initial steps to facilitate terminating one or more optical fibers from a fiber optic cable with a fiber optic connector to form a cable assembly.

In this disclosure, the term "optical fiber assembly" refers to an assembly that includes a ferrule secured to at least one optical fiber. Additional components may be included as part of the assembly, but are not necessarily required unless explicitly stated in the claims that follow this detailed description. Additionally, the terms "assembly" and "sub-assembly" are considered to be interchangeable as the context requires. That is, reference to an "assembly" does not preclude that assembly being used as a sub-assembly for another article or apparatus (e.g., as alluded to above, an optical fiber assembly may be a sub-assembly for a cable assembly).

Also in this disclosure, the term "fiber optic connector" refers to an assembly that includes a ferrule and a connector body, with the ferrule intended to facilitate the alignment of optical fibers for optical coupling, and with the connector body intended to facilitate mechanical coupling (e.g., to an adapter). Other components may be included as part of such an assembly, but are not necessarily required unless explicitly stated in the claims that follow this detailed description. The terms "connector assembly", "connector sub-assembly", "optical connector", and "connector" are considered to be interchangeable with "fiber optic connector" in this disclosure.

Also in this disclosure, the term "curing time" refers to the time it takes from the initiation of curing reaction for the curable adhesive composition to achieve about 80% of its ultimate load capacity or strength under substantially dry conditions, with ambient temperature at about 25° C. Thus, curing times that are stated as a characteristic of the adhesive composition are based on a reference temperature of about 25° C. (ambient conditions). In this regard, "curing time" may be considered as a "reference curing time" unless otherwise clear from context. An actual cure time may be different than the reference curing time if there are different conditions (e.g., different temperatures) under which the curing reaction occurs.

Likewise, in this disclosure, a curable adhesive composition is considered to be "cured" when the adhesive composition achieves about 80% of its ultimate load capacity or strength under substantially dry conditions.

Also in this disclosure, the term "back reflectance" refers to light reflected from a surface of a photocurable material or bonding agent. In one embodiment, back reflection refers to light or beam reflected from an interface between a photocurable material or bonding agent and an optical fiber.

In this disclosure, the term "degree of cure" refers to the percentage of the entire curable adhesive that has completed the curing reaction for the curable adhesive. Therefore, "degree of cure" is intended to be used interchangeably with "percentage of adhesive cured" or "percentage cured."

One example of a fiber optic connector (also referred to as "optical connector 10", or simply "connector 10") for such a cable assembly is shown in FIG. 1. Although the connector 10 is shown in the form of a SC-type connector (e.g., according to IEC 61754-4:2013), the methods described below may be applicable to processes involving different fiber optic connector designs. This includes LC, SN and MDC (according to the QSFP-DD Multi-Source Agreement (MSA) Hardware Specification, Rev. 6.0, 2021, and the relevant documents cross-referenced therein), and MPO-type connectors, for example, and other single-fiber or multi-fiber connector designs. A general overview of the connector 10 will be provided simply to facilitate discussion.

Figure 2:
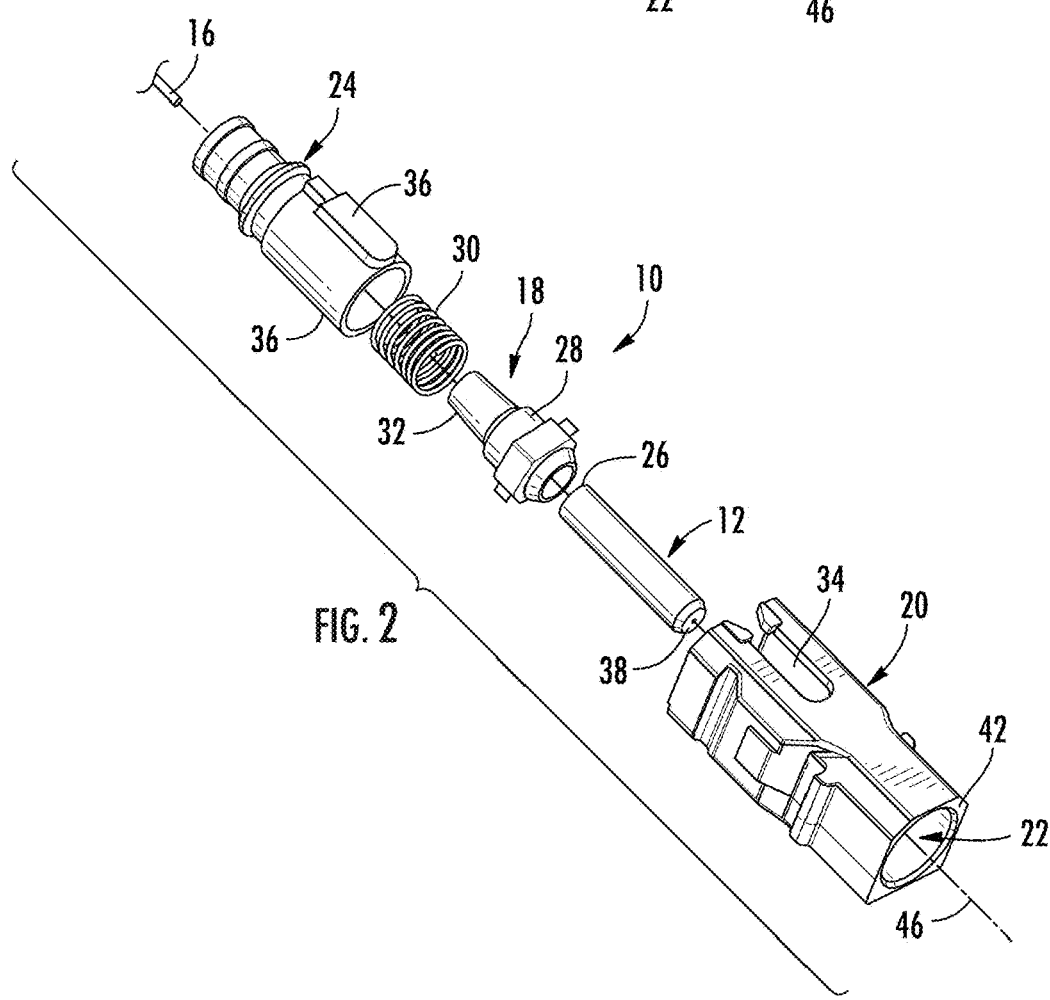
FIG. 2 is an exploded perspective view the fiber optic connector of FIG. 1.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "retention body 24" or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments.

The ferrule holder 18 is biased to a forward position within the housing 20 by a spring 30, which extends over a second portion 32 of the ferrule holder 18 that has a reduced cross-sectional diameter/width compared to the first portion 28. The spring 30 also interacts with internal geometry of the connector body 24, which may be secured to the housing 20 using a snap-fit or the like. For example, FIGS. 1 and 2 illustrate a rear portion of the housing 20 having cut-outs or slots 34 on opposite sides so as to define a split shroud. The connector body 24 has tabs 36 configured to be snapped into the slots 34 and retained therein due to the geometries of the components.

When the connector 10 is assembled as shown in FIG. 1, a front end 38 of the ferrule 12 ("ferrule end face 40") projects beyond a front end 42 of the housing 20. The ferrule end face 40 presents the optical fiber 16 ("fiber end 44") for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 48 (hereinafter "cable 48") including the optical fiber 16 can be terminated with the connector 10. In other words, the connector 10 can be installed on the cable 48 to form a fiber optic cable assembly 50. The cable 48 is merely an example to facilitate discussion. In the embodiment shown, the fiber cable 48 includes an outer jacket 52, inner jacket 54, strength members 56 in the form of aramid yarn, and the optical fiber 16, which itself has a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 48 is merely an example, as persons skilled in optical connectivity will appreciate how different cable designs may be terminated with the connector 10.

Figure 3:
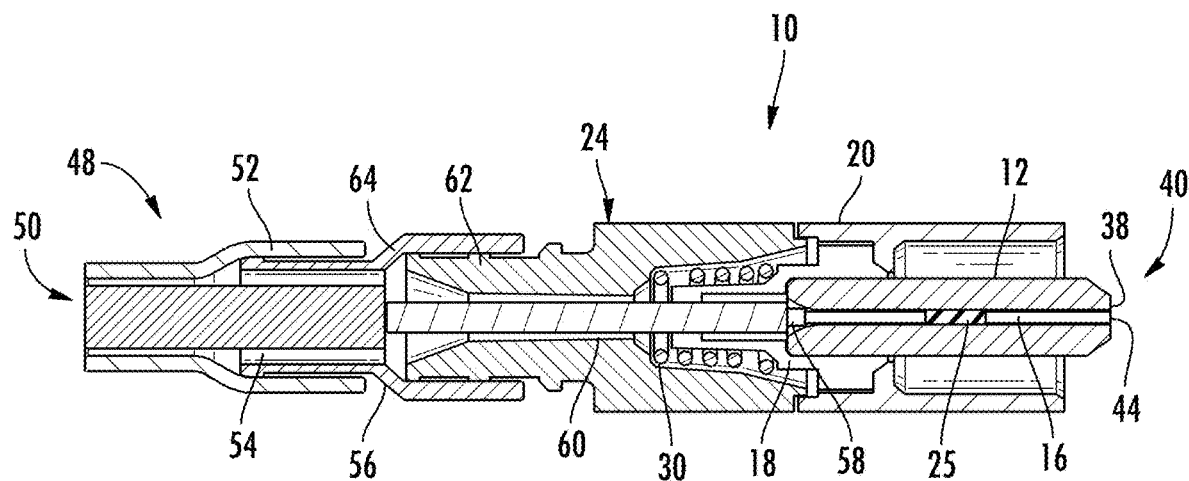
FIG. 3 is a cross-sectional view of a fiber optic connector of FIG. 1 installed on a fiber optic cable.
Figure 4:
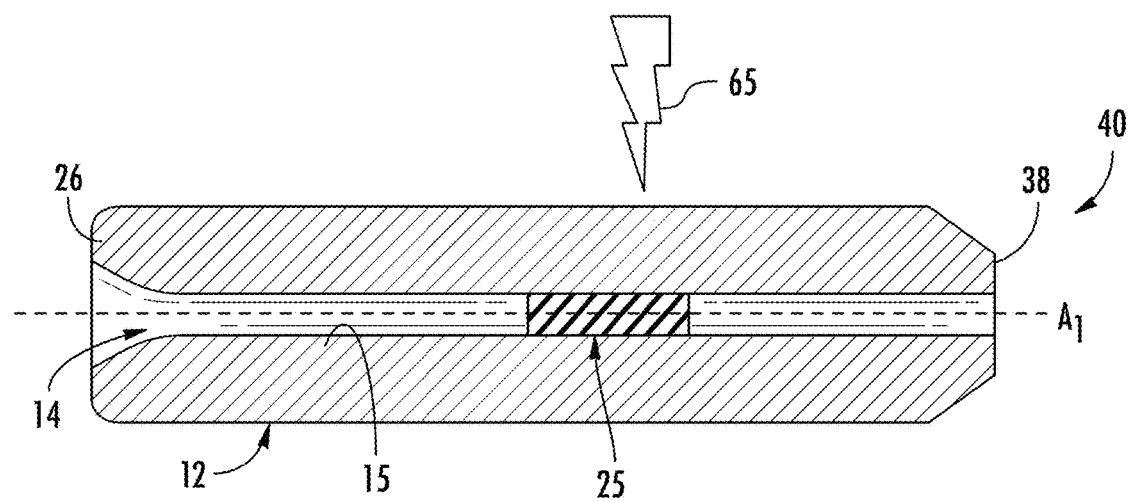
FIG. 4 is a cross-sectional view of a ferrule and a bonding agent disposed in a ferrule bore of the ferrule of the fiber optic connector shown in FIG. 1.

FIG. 3 illustrates the connector 10 in further detail, and FIG. 4 is an enlarged view of the ferrule 12 in isolation. As shown, ferrule 12 is a standard ferrule where ferrule bore 14 has a substantially consistent diameter throughout a length of ferrule 12. However, it is within the scope of the present disclosure that alternate ferrules may be used, such as a counterbore ferrule or a ferrule 12 having ferrule bore 14 with varying diameters throughout the length of ferrule 12, for example. In general, the ferrule 12 includes a ferrule bore 14 extending between the front and rear ends 14, 16 along a longitudinal axis A1. The front and rear ends 14, 16 define respective front and rear end faces of the ferrule 12 that extend in planes parallel or substantially parallel to each other but substantially perpendicular to the longitudinal axis A1. In some embodiments, the front end face may be at a slight angle relative to the longitudinal axis A1 to provide, for example, an angled physical contact (APC) end face.

Figure 5:
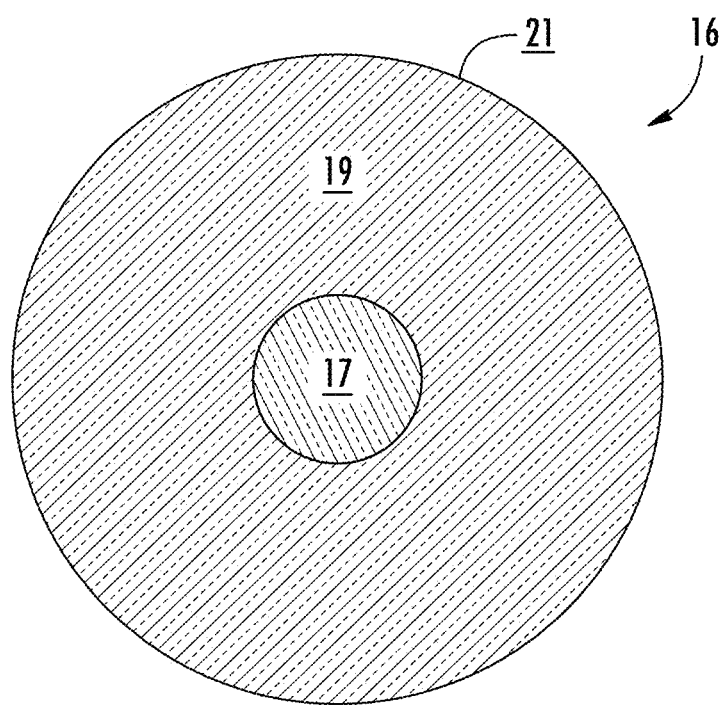
FIG. 5 is a cross-sectional view of an example optical fiber configured to be inserted into the ferrule of FIG. 4.

Ferrule 12 is intended to terminate an optical fiber 16, an example of which is shown in FIG. 5. Optical fiber 16 is configured to be inserted into ferrule 12 and optical fiber connector assembly 50 is shown. Optical fiber 16 includes a core 17 and a cladding 19 surrounding core 17 to define an external surface 21 of optical fiber 16. Core 17 and cladding 19 are composed of materials with an appropriate refractive index differential to provide desired optical characteristics as discussed below. Cladding 19 includes all glass portions (e.g., silica glass) of an optical fiber 16 outside core 17 and is not limited to glass portions of optical fiber 16 outside of core 17 which are optically functional. In some embodiments, the optical fiber 16 may further include coating layer 58 (FIG. 8, e.g., acrylate coating) that surrounds the cladding 19. In some embodiments, the coating layer that surrounds the cladding 19 may be an acrylate polymer material. In further embodiments, the coating layer that surrounds the cladding 19 may be an acrylate polymer material that is different than bonding agent 25.

In some embodiments, optical fiber 16 has a diameter of about 125 microns. In some embodiments, optical fiber 16 has a numerical aperture ranging between 0.1 and 0.6 or between 0.1 and 0.5. In some embodiments, optical fiber 16 has a numerical aperture of about 0.5.

Figure 8:
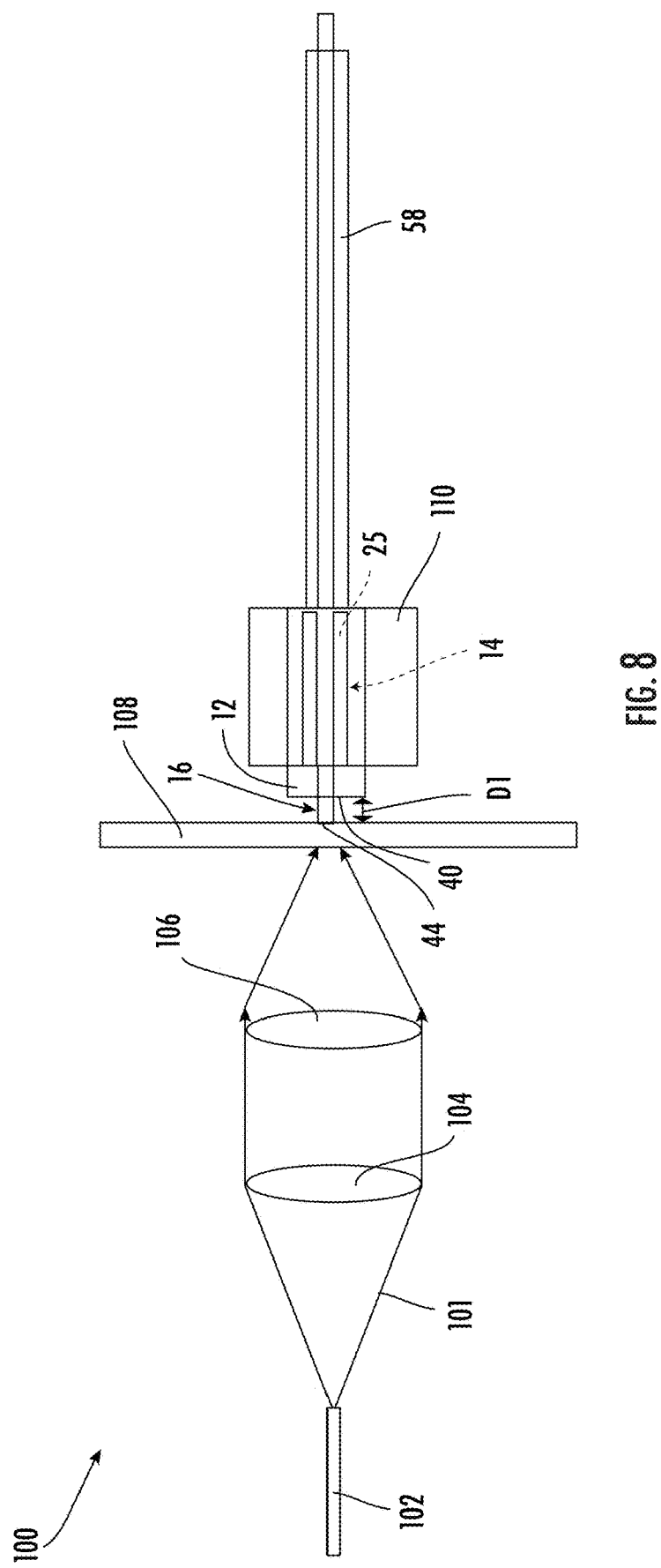
FIG. 8 is a schematic of a laser apparatus used in accordance with the present disclosure.
Figure 9:
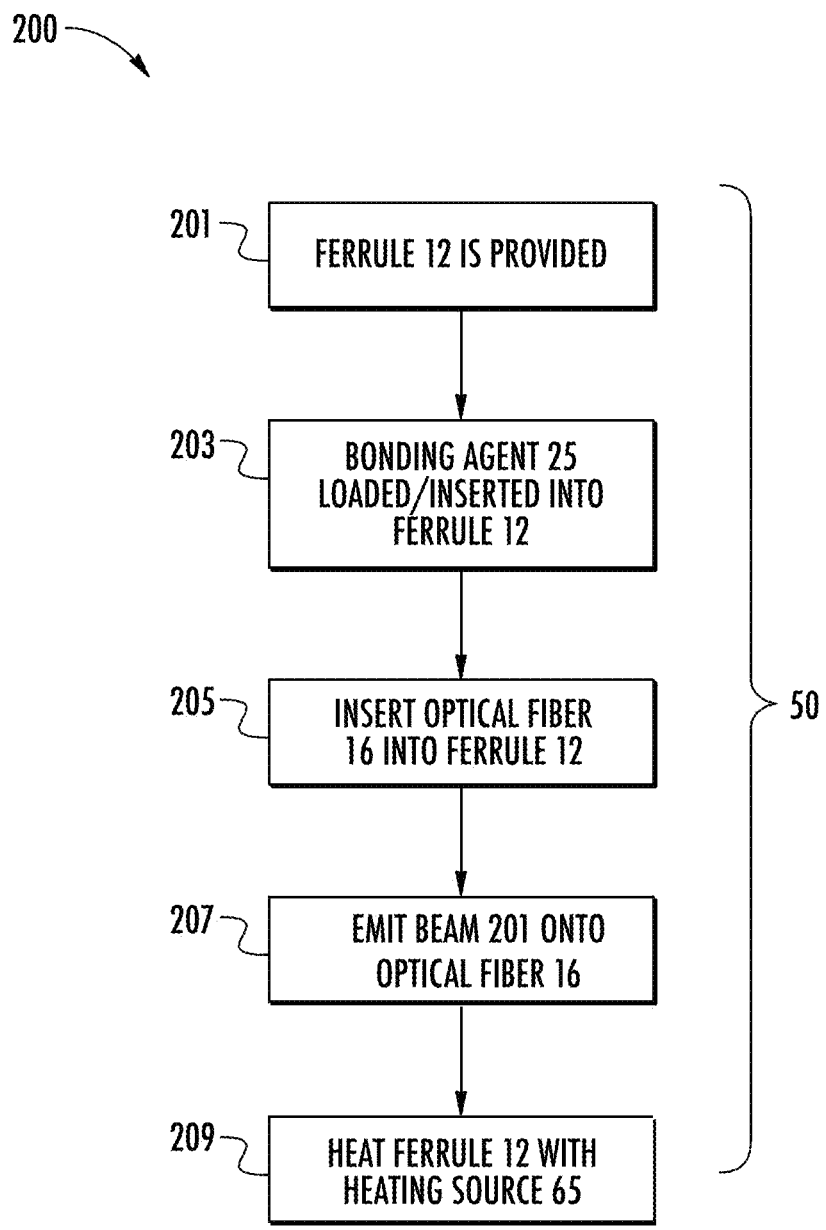
FIG. 9 is a flowchart illustrating a method of assembling a fiber optic connector assembly.

The refractive index of core 17 is higher than the refractive index of the cladding 19 at a wavelength of the beam 101 (FIG. 8). In some embodiments, the cladding 19 may at least partially surround the circumference of the core 17. In some embodiments, the cladding 19 may entirely surround the circumference of the core 17 as shown. In some embodiments, the cladding 19 may be made of a low-index polymer. Examples of low index polymers include fluorinated polymers and silicone based polymers. In some embodiments, cladding 19 can comprise glass. In some embodiments, core 17 may be formed from silica-based glass. However, it should be understood that other embodiments are contemplated and possible, such as embodiments where the core 17 is formed from polymer material.

In some embodiments, core 17 may have a refractive index of greater than or equal to 1.45 at a wavelength of 590 nm. In some embodiments, the core 17 may have a refractive index of greater than or equal to 1.45, greater than or equal to 1.46, or greater than or equal to 1.50 at a wavelength of 590 nm. In some embodiments, core 17 may have a refractive index of from greater than or equal to 1.45 to less than or equal to 1.60, from greater than or equal to 1.45 to less than or equal to 1.50, from greater than or equal to 1.50 to less than or equal to 1.60 at a wavelength of 590 nm.

Exemplary optical fibers may include single-mode fibers, such as SMF-28 Ultra manufactured by Corning Inc., and multimode fibers, such as 50 μm and 62.5 μm multimode fibers manufactured by Corning, Inc.

Part of terminating optical fiber 16 to form fiber optic cable assembly 50 includes disposing a bonding agent 25 in ferrule bore 14, an example of which is shown in FIGS. 3 and 4. As shown, bonding agent 25 may be seated or pre-loaded within ferrule bore 14 in a solid form and is in contact with inner wall 15 of ferrule bore 14. In an alternate embodiment, as discussed in greater detail herein, bonding agent 25 may be injected into ferrule bore 14 in a liquid form.

Figure 6A:
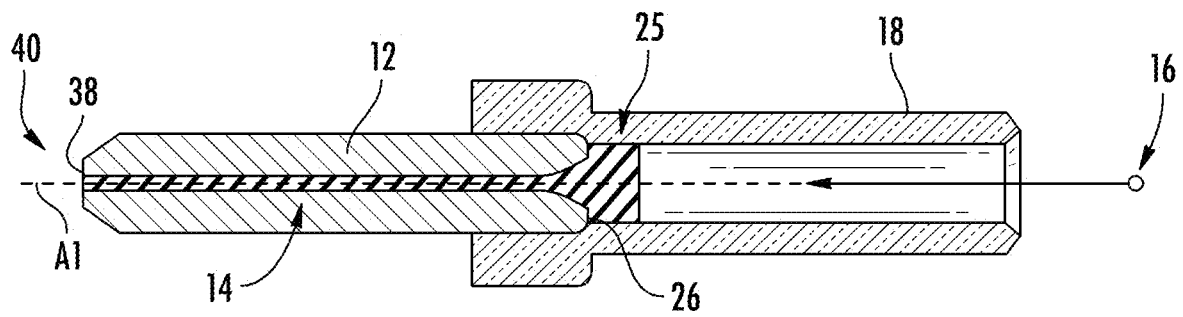
FIGS. 6A-6C are cross-sectional views of the ferrule and a ferrule holder with an optical fiber illustrating the locations of a bonding agent.
Figure 6B:
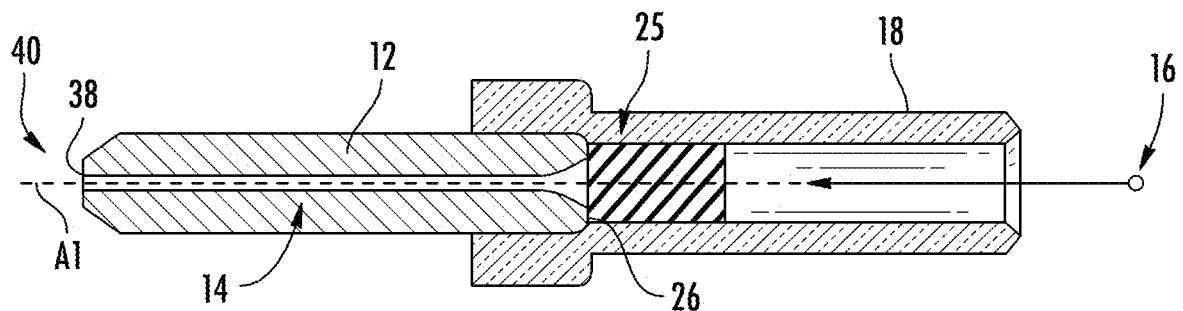
Figure 6C:
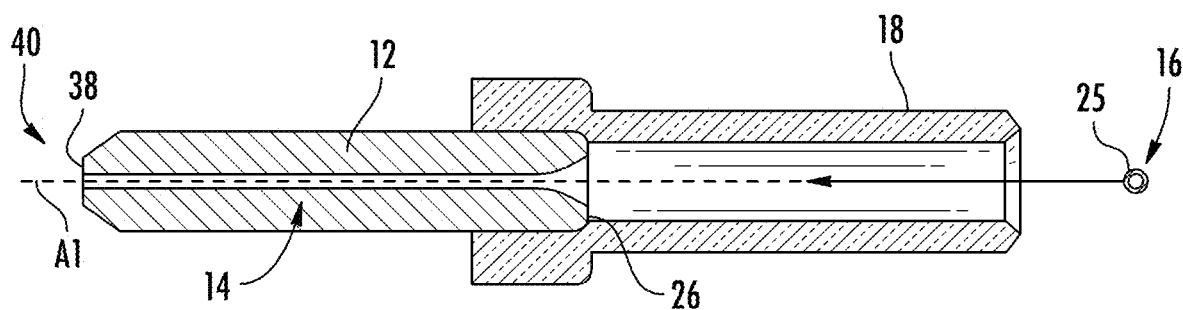

Referring briefly to FIGS. 6A-6C, various examples of disposing bonding agent 25 in ferrule 12 and/or ferrule holder 18 are shown. Referring first to FIG. 6A, bonding agent 25 is injected into ferrule bore 14 through ferrule holder 18. As shown, bonding agent 25 is seated substantially throughout the length of ferrule bore 14 with a portion of bonding agent 25 seated beyond rear end 26 of ferrule 12. When optical fiber 16 is inserted into ferrule holder 18 and ferrule 12, optical fiber 16 is inserted through ferrule holder 18, ferrule 12, and bonding agent 25 such that optical fiber end 44 extends beyond ferrule end face 40 and contacts stopper 108 as discussed herein. In another embodiment, with reference to FIG. 6B, bonding agent 25 is injected through ferrule holder 18 with bonding agent 25 seated beyond rear end 26 of ferrule 12 such that optical fiber end 44 extends beyond ferrule end face 40 and contacts stopper 108 as discussed herein. In this embodiment, optical fiber 16 is inserted through ferrule holder 18, through bonding agent 25, and into ferrule bore 14 with bonding agent 25 on external surface 21 of optical fiber 16. In another embodiment, bonding agent 25 is inserted into ferrule holder 18 where optical fiber 16 is inserted into ferrule holder 18 and ferrule 12 with bonding agent 25 on external surface 21 of optical fiber 16 (as shown in FIG. 6C) such that optical fiber end 44 extends beyond ferrule end face 40 and contacts stopper 108 as discussed herein.

Bonding agent 25 is configured to couple an optical fiber 16 within ferrule 12 to form a connector assembly 50. In some embodiments, bonding agent 25 comprises a photoactive adhesive that can also be cured by heat. An example photoactive adhesive includes Norland Optical Adhesive (NOA) 86H manufactured by Norland. However, it is within the scope of the present disclosure that in alternate embodiments, other photoactive adhesives may be used, such as Epotek HYB-353ND, Epoxyset UV-8701E, Dymax 9801, for example, or the like. Bonding agent 25 is a low viscosity liquid that can be injected into ferrule bore 14. In some embodiments, bonding agent 25 has a viscosity ranging between 100 cP and 10,000 cP, between 100 cP and 5000 cP, or between 100 cP and 1000 cP at room temperature (about 25° C.). In some embodiments, bonding agent 25 (after the curing time) has a glass transition temperature above 80° C., above 90° C., or above 100° C. In some embodiments, bonding agent 25 (after the curing time) has an elastic modulus of at least 1 GPa.

Bonding agent 25 has a refractive index that is greater than the refractive index of core 17 and cladding 19 of optical fiber 16 so that sufficient light can be extracted from core 17 and cladding 19 to cure bonding agent 25. In some embodiments, bonding agent 25 has a refractive index that is greater than the refractive index of cladding 19 of optical fiber 16 by between 0.04 to 0.12, between 0.04 and 0.11, or between 0.04 to 0.10. The refractive index difference (between bonding agent 25 and cladding 19 of optical fiber 16) of bonding agent 25 being greater than 0.04 may help light leakage from cladding 19 at a distance of between 10 mm and 15 mm within ferrule bore 14 as measured from a front surface of ferrule 12 (or front end 38 of ferrule 12), and the refractive index difference (between bonding agent 25 and cladding 19 of optical fiber 16) of bonding agent 25 being 0.12 or less, or even 0.10 or less, helps ensure that enough light will reach a back end of connector 10 (greater refractive index differences may result in too much light being extracted at a short distance within ferrule bore 14).

Bonding agent 25 can cure in different ways. In one embodiment, bonding agent can be cured by beam 101 having a wavelength ranging between 315 nm and 450 nm, between 315 nm and 425 nm, or between 315 nm and 420 nm. Curing time can be further accelerated by increasing the temperature (i.e., adding heat) under which bonding agent 25 cures. In some embodiments, bonding agent 25 is cured by combining light treatment and heat treatment (increasing temperature/adding heat) described above. For example, in some embodiments and as described herein, curing of bonding agent 25 is initiated by a beam 101 applied onto bonding agent 25 having a wavelength between 315 nm and 450 nm with heat applied onto ferrule 12 and bonding agent 25 simultaneously at a temperature ranging between 60° C. and 150° C. In this embodiment, curing time is less than 10 seconds. In an alternate embodiment, curing of bonding agent 25 is initiated by a beam 101 applied onto bonding agent 25 having a wavelength between 315 nm and 450 nm with heat applied onto ferrule 12 and bonding agent 25 thereafter at a temperature ranging between 60° C. and 150° C. In this embodiment, curing time ranges from less than 30 seconds, less than 20 seconds, or less than 10 seconds.

Figure 7:
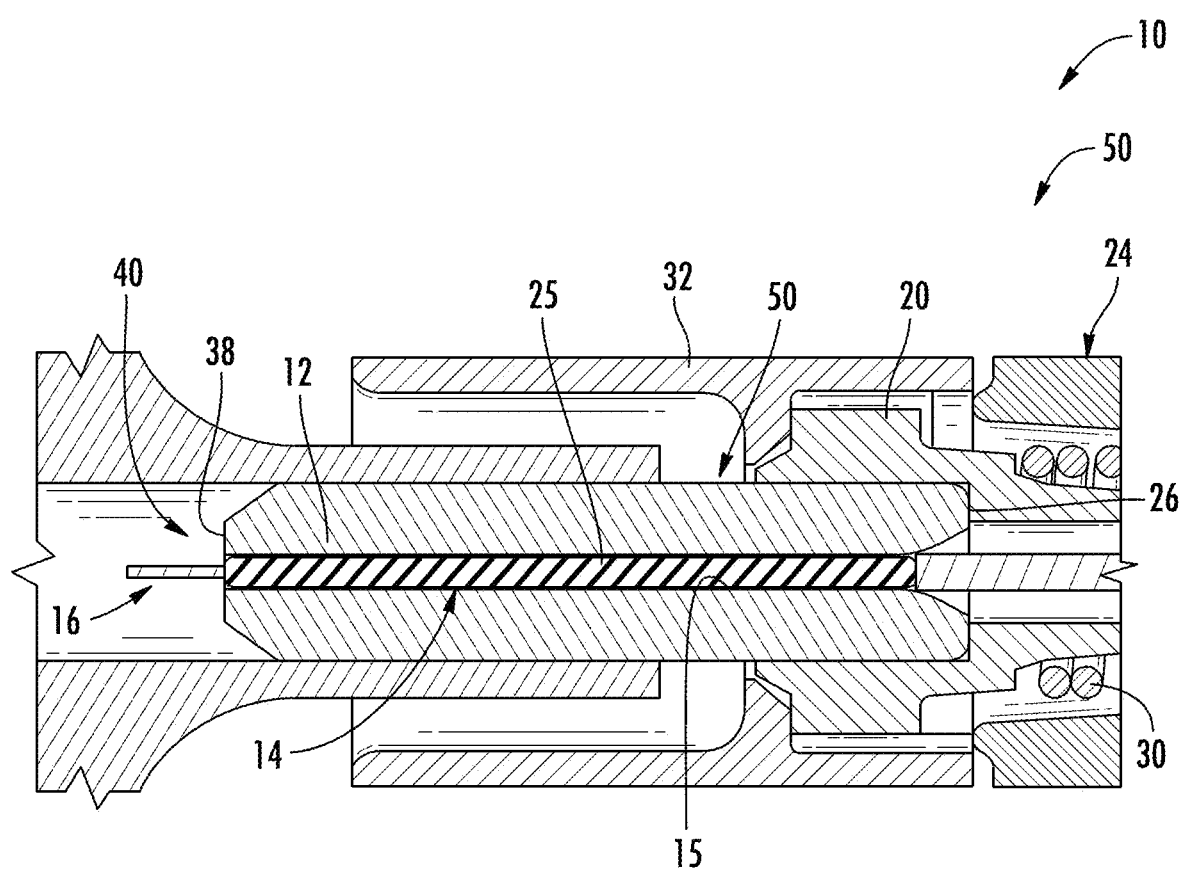
FIG. 7 is a cross-sectional view of a fiber optic connector assembly.

As shown in FIG. 7, an optical fiber 16 is inserted into ferrule 12 to form optical fiber connector assembly 50. In some embodiments, optical fiber connector assembly 50 has a mean insertion loss of less than or equal to 0.25 dB, between 0.12 dB and 0.25 dB, or less than or equal to 0.12 dB at a reference wavelength of 1310 nm as measured according to Telecordia GR-326. In some embodiments, optical fiber connector assembly 50 has a maximum insertion loss for 97% of samples tested of less than or equal to 0.50 dB, between 0.25 dB and 0.50 dB, or less than or equal to 0.25 dB at a reference wavelength of 1310 nm as measured according to Telecordia GR-326. In some embodiments, optical fiber connector assembly 50 has a fiber retention or pull out force of at least 10 N.

Referring now to FIG. 8, a laser apparatus 100 is shown. Laser apparatus 100 is configured to laser treat optical fiber connector assembly 50 as discussed below and to monitor curing of bonding agent 25.

The laser apparatus 100 for monitoring curing of bonding agent 25 includes a laser 102, a lenses 104, 106, a stopper 108, and a heater 110. As shown in FIG. 8, laser 102 emits beam 101 onto optical fiber end 44. In some embodiments, beam 101 has a wavelength in the range of 300 nm and 450 nm, 315 nm and 425 nm, or 315 nm and 420 nm. In one embodiment, beam 101 has a wavelength of about 405 nm. In some embodiments, laser 102 emits laser beam 101 that is a continuous wave (CW wave). In some embodiments, laser 102 emits laser beam pulses at a pulse width 1 ns and 30 ns. In some other embodiments, laser 102 emits laser beam pulses at a pulse width between 0.2 picoseconds (ps) and 20 ps, 3 ps and 17 ps, or 5 ps and 15 ps. In some embodiments, laser 102 emits beam 101 at a repetition rate ranging between 1 kilohertz (kHz) and 100 kHz, 20 kHz and 85 kHz, or 25 kHz and 75 kHz. In one embodiment, laser 102 emits beam 101 at a repetition rate of 50 kHz. In some embodiments, laser 102 emits laser beam 101 at an output power ranging between 100 mW and 1000 mW, between 200 mW and 800 mW, or between 400 mW and 700 mW. In one embodiment, laser 102 emits beam 101 at an output power of 600 mW with CW wave output from a laser diode. In some embodiments, laser 102 of laser apparatus 100 laser treats one optical fiber connector assembly 50. In some embodiments, laser 102 of laser apparatus 100 laser treats multiple optical fiber connector assemblies 50 with a single laser 102.

In embodiments, the beam 101 may have an intensity of from greater than or equal to 0.1 W/cm$^2$ to less than or equal to 80000 W/cm$^2$ as applied onto fiber end 44 of optical fiber 16. In embodiments, the beam 101 may have an intensity of from greater than or equal to 0.1 W/cm$^2$ to less than or equal to 6000 W/cm$^2$, from greater than or equal to 0.1 W/cm$^2$ to less than or equal to 5000 W/cm$^2$, from greater than or equal to 0.1 W/cm$^2$ to less than or equal to 4000 W/cm$^2$, from greater than or equal to 0.1 W/cm$^2$ to less than or equal to 300 W/cm$^2$, from greater than or equal to 0.1 W/cm$^2$ to less than or equal to 2000 W/cm$^2$, from greater than or equal to 0.1 W/cm$^2$ to from less than or equal to 1000 W/cm$^2$.

When beam 101 is emitted, beam 101 travels through laser apparatus 100 onto optical fiber connector assembly 50. In particular, beam 101 contacts bonding agent 25 and optical fiber 16. Beam 101 initiates curing of bonding agent 25 due to refraction of beam 101 resulting from the refractive index difference between bonding agent 25 and optical fiber 16.

Lenses 104, 106 are configured to redirect and focus beam 101 onto fiber end 44 of optical fiber 16 through stopper 108. In some embodiments, lens 104 is a collimating lens and lens 106 is a long working distance lens. However, it is contemplated that in alternate embodiments, alternate lenses and/or alternate series/configurations of lenses 104, 106 may be used to redirect and focus beam 101 onto fiber end 44 of optical fiber 16 through stopper 108. In some embodiments, lenses 104, 106 have numerical apertures ranging between 0.05 and 0.4, between 0.1 and 0.3, or between 0.15 and 0.25.

Stopper 108 is configured to further focus beam 101 from lenses 104, 106 onto fiber end 44 of optical fiber 16. Advantageously, stopper 108 provides a reference structure form which fiber end 44 of optical fiber 16 is positions. This enables repeatable positioning of fiber end 44 of optical fiber 16 such that fiber end 44 is positioned at a focusing position of lens 106 (i.e., the focus of lens 106). In addition, stopper 108 positions optical fiber 16 (by contacting fiber end 44) once optical fiber 16 is inserted into ferrule 12 such that fiber end 44 aligns with beam 101 emitted by laser 102. In some embodiments, stopper 108 is made of glass. However, it is contemplated that in alternate embodiments, other suitable materials may be used for stopper 108. As shown in FIG. 8, stopper 108 is spaced from ferrule end face 40 by a spacing distance D1. In some embodiments, spacing distance D1 ranges between 0.1 mm and 2 mm, between 0.5 mm and 1.5 mm, or between 0.7 mm and 1.2 mm.

As discussed herein, optical fiber 16 is inserted into ferrule 12 such that bonding agent 25 contacts inner wall 15 of ferrule 12 and external surface 21 of optical fiber 16. As shown, ferrule 12 is surrounded by a heater 110 (positioned on a stage) configured to apply heat onto ferrule 12 and bonding agent 25 to raise the temperature of ferrule 12 and bonding agent 25 to a particular temperature. In some embodiments, heater 110 is an electrothermal heating sleeve that may be preset to an elevated temperature ranging between 60° C. and 120° C.

To assemble an optical fiber connector assembly 50, a method 200 is shown in FIG. 8. Method 200 begins at step 201 where a ferrule 12 is provided. Then, a bonding agent 25 is loaded/inserted into ferrule 12 at step 203 as discussed above with reference to FIGS. 6A-6C. Then, at step 205, optical fiber 16 is inserted into ferrule bore 14 of ferrule 12 where optical fiber 16 is inserted into ferrule 12 such that fiber end 44 contacts stopper 108. In some embodiments, insertion distance of optical fiber 16 is controlled by controlling fiber insertion distance by other suitable methods. Upon insertion of optical fiber 16, beam 101 is emitted by laser 102 of laser apparatus 100, and beam 101 is emitted onto optical fiber 16 to initiate curing of bonding agent 25 in step 207. Ferrule 12 is then heated by a heat source 65 (FIG. 4) or heater 110 (FIG. 8) to a curing temperature ranging between 60° C. and 150° C. to further cure bonding agent 25 with a curing time of less than 10 seconds at step 209. As mentioned previously, in some embodiments, steps 207 and 209 are performed simultaneously. However, in other embodiments, steps 207 and 209 are performed sequentially. In some embodiments, heat source 65 is heated by a heating sleeve using electrothermal heating. In other embodiments, alternate suitable heating methods may be used. In some embodiments, steps 207 and 209 can be performed simultaneously. That is, beam 101 can be emitted onto optical fiber 16 and ferrule 12, and at the same time, ferrule 12 can be heated to accelerate curing of bonding agent 25. Simultaneous execution of steps 207 and 209 can reduce cycle time of method 200.

Examples

Degree and Dynamics of Cure

Figure 10:
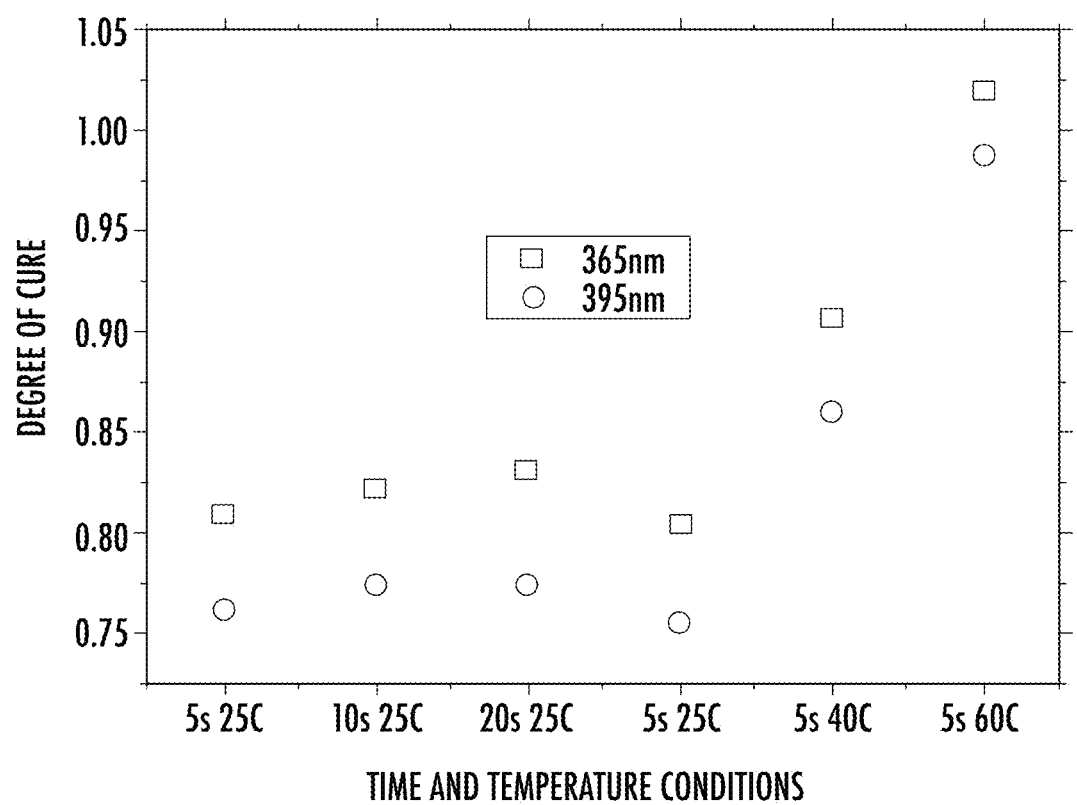
FIG. 10 relates to the Example and shows degree of cure of a bonding agent as a function of time under cure and curing temperature.

Referring briefly to FIG. 10, various samples as prepared by method 200 with the samples having uncured bonding agent 25 were prepared and underwent various curing conditions (time and temperature) with their cure conversion measured by Fourier-transform infrared (FTIR) spectroscopy as a function of time under cure and cure temperature and with varying wavelengths (365 nm and 395 nm) of beam 101. As shown, at a time under cure of 5 seconds, 10 seconds, and 20 seconds and curing temperature of 25° C., a degree of cure of bonding agent 25 ranging between 75% and 85% was achieved. However, as also shown, at a time under cure of 5 seconds at curing temperatures greater than 25° C. (i.e., 40° C., and 60° C.), a greater degree of cure was achieved independent of the wavelength of beam 101. In particular, the degree of cure of bonding agent 25 ranged between 85% and 100% over the cure time of 5 seconds.

Figure 11:
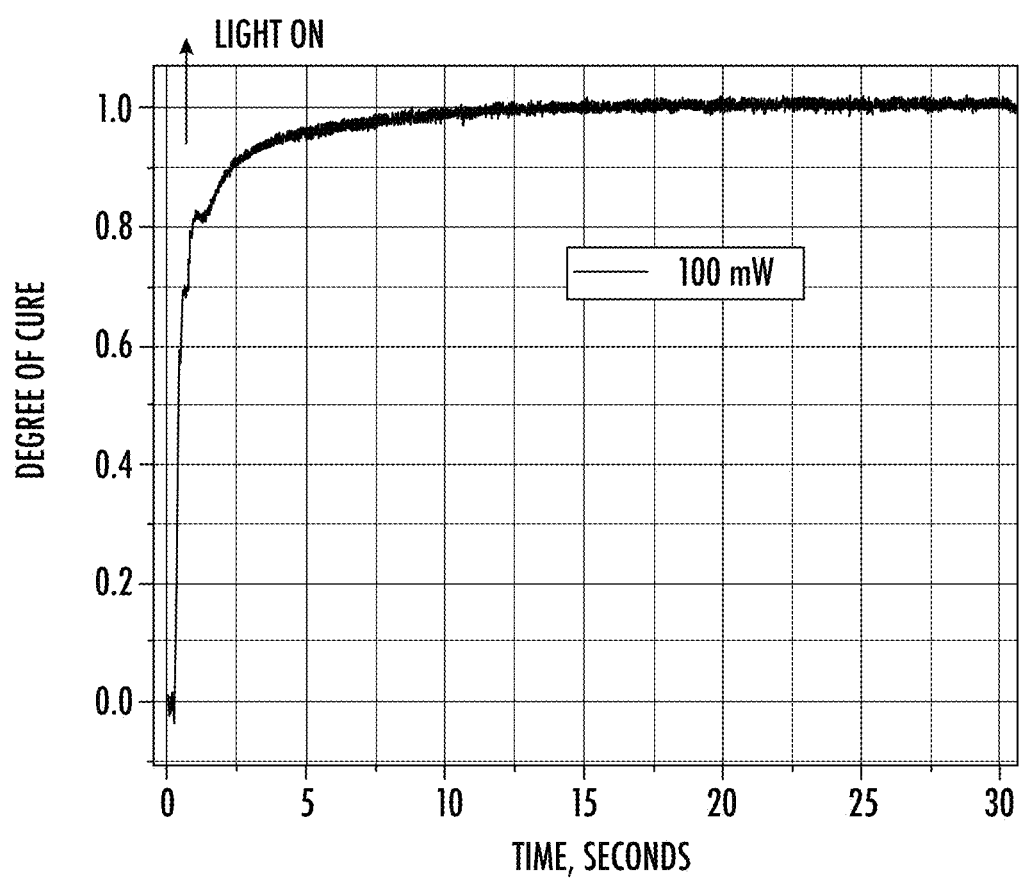
FIG. 11 relates to the Example and shows degree of cure of a bonding agent as a function of time.

Referring now to FIG. 11, dynamics of curing bonding agent 25 with laser apparatus 100 is shown. Samples were prepared by method 200 with the samples having uncured bonding agent 25 prior to curing under laser apparatus 100. To cure, laser 102 operated at a power output of 100 mW and a wavelength of 405 nm. As shown, bonding agent 25 can be considered cured at a curing time of about 1.5 seconds. In addition, bonding agent 25 reaches 100% cure at about 10 seconds of exposure to beam 101.

Referring now to FIGS. 12A-12D, simulations of beam 101 at a wavelength of 405 nm emitted by laser 102 at a power of 200 mW and a 1 dB coupling loss of beam 101 entering optical fiber 16 is shown. In particular, simulations of propagation of beam 101 within optical fiber 16 are shown in FIGS. 12A and 12C with corresponding beam intensities absorbed by bonding agent 25 shown in FIGS. 12B and 12D. For FIGS. 12A and 12B, the numerical aperture of lenses 104, 106 was 0.05, and beam 101 filled the entirety of cladding 19. For FIGS. 12C and 12D, the numerical aperture of lenses 104, 106 was 0.04 and beam 101 filled an area of cladding 19 having a diameter of 50 microns.

FIGS. 12A-12D show that by optimizing input beam 101, numerical aperture of coupling lenses 104, 106, and focusing area in cladding 19, absorption of beam 101 to cure adhesive can be optimized for the entire ferrule bore 14 including a back end of connector assembly 50. FIGS. 12A-12D also show the simulation of beam 101 propagation in optical fiber 16 where beam 101 is emitted by laser 102 at a wavelength 405 nm, input power 200 mW, and 1 dB coupling loss of beam 101 entering optical fiber 16.

From curing conditions that require UV energy, the energy of beam 101 is about 2.5 J/cm$^2$. In the simulations shown in FIGS. 12A and 12B, the average intensity in the area of bonding agent 25 at the end of optical fiber 16 is about 0.6 W/cm$^2$. Based on these values, the curing time can be determined to be about 4 seconds. Similarly, in the simulations shown in FIGS. 12C and 12D, the average intensity in the area of bonding agent 25 is about 1.2 W/cm$^2$, and based on this value, the curing time can be determined to be about 2 seconds.

Sample Preparation and Degree of Cure

Sample optical fiber connector assemblies were prepared using laser apparatus 100 and method 200 described herein where ferrule 12 was laser treated and heat treated. In particular, the temperature of ferrule 12 was preset to 60° C. and beam 101 emitted by laser 102 had a wavelength of 405 nm with laser 102 having a power output of 150 mW. The total time under cure of the samples was 10 seconds. After cure, sample optical fiber connector assemblies were polished, and there was no obvious fiber damage or cracking on fiber end 44 thereby indicating that bonding agent 25 had cured enough to maintain optical fiber positioning during polishing.

Sample optical fiber connector assemblies were then disassembled, and the degree of cure of adhesive at a back end of ferrule 12 was measured. The degree of cure was measured at approximated 75% of total cure.

Insertion Loss

Insertion loss and data of optical fiber connector assemblies 50 as prepared by method 200 was measured in accordance with IEC61753-1. The mean insertion loss of the samples was less than or equal to 0.25 dB, and the maximum insertion loss of the samples was less than or equal to 0.50 dB.

Insertion loss change after temperature/thermal cycling (from −25° C. to 70° C.) for samples prepared in accordance to method 200 described herein with a 200° C. curing temperature is shown. As shown, the mean change in insertion loss after thermal cycling was less than or equal to 0.2 dB, which also meets IEC 61753.

Also, the above data show that insertion loss performance of connector assemblies 50 meet Telecordia GR-326.

Fiber Pull-Out or Retention Force

Optical fiber pull-out force was measured by using a force gauge and associated apparatus to impart opposite axial forces on the optical fiber and the ferrule. The pull-out test procedure generates data relating to the maximum force, the force when the optical fiber stub protruding from the front of the ferrule begins to move, and the failure mode. There are five failure modes: break, slip, pull, slip break, and no fiber stub. If the failure mode was a break, the location of the break was measured relative to the edge of the coating and recorded.

Fiber pull-out testing was performed on 5 samples prepared as outlined above. The pull-out force along with the failure modes were recorded for post thermal cycling (from −25° C. to 70° C.) according to IEC 61753 as shown in Table 1 below. As shown in Table 1, there is a degradation in optical fiber to ferrule adherence when a sample was subjected to thermal cycling. Table 1 also shows how the dominate failure mode shifts (from "Slip" or "Pull" to "Break") different modes after connector assembly 50 has been exposed to high temperature and humidity.

TABLE 1

| Sample | Average Pull Out Force (lbf) | Failure Mode | Delta Movement (nm) |
|---|---|---|---|
| 1 | 4.38 | Break | −190.13 |
| 2 | 4.36 | Break | −179.39 |
| 3 | 4.16 | Break | −52.17 |
| 4 | 4.45 | Break | −144.04 |

As shown in Table 1, fiber pull-out force averaged to about 4 pounds force (lbf) after thermal aging (temperature cycling from −25° C. to 75° C.) thereby passing IEC specification—IEC 61753.

Fiber Movement

Sample optical fiber connector assemblies 50 as prepared by method 200 outlined above were selected for fiber movement testing before and after thermal cycling. The samples were loaded into a thermal and humidity controlled chamber where the samples were thermally cycled as discussed above.

As used herein, "fiber movement" refers to the measured position change of an end of the optical fiber 16 relative to front end 14 of ferrule 12 before and after thermal cycling (temperature cycling from −25° C. to 75° C. or from −10° C. to 60° C.). The delta movement of the sample optical fibers 16 within connectors using bonding agent 25 among all groups was less than 300 nm.

Persons skilled in optical connectivity will appreciate additional variations and modifications of the elements disclosed herein. Such persons will also appreciate variations and modifications of the methods involving the elements disclosed herein. For example, although embodiments are described above where less than all of the bonding agent is melted and solidified when forming a fiber optic connector sub-assembly, in alternative embodiments all or substantially all of the bonding agent may be melted and solidified. In addition, skilled persons will appreciate alternatives where some of the steps described above are performed in different orders. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. A method of assembling an optical fiber assembly, wherein the optical fiber assembly includes a ferrule having a front end, a rear end, and a ferrule bore extending between the front and rear ends, the method comprising:
    disposing a bonding agent into the ferrule;
        wherein the bonding agent has a viscosity ranging between 100 cP and 10000 cP at a temperature of about 25° C. and a reference curing time of less than 1 minute;
    inserting an optical fiber into the ferrule bore and through the bonding agent; and
    emitting a light onto the optical fiber, wherein emitting the light causes between 75% and 85% of the bonding agent in the ferrule to cure and thereby form the optical fiber assembly;
    heating at least a portion of the ferrule to at least 60° C. while the bonding agent is in the ferrule bore, wherein the heating step comprises heating an entire length of the ferrule.

2. The method of claim 1, wherein the heating step is conducted simultaneously with the emitting step.

3. The method of claim 1, wherein the emitting step causes the between 75% and 85% of the bonding agent to cure in about 5 seconds or less.

4. The method of any of claim 1, wherein the emitting step includes using a laser emitting a beam at a power ranging between 100 mW and 1000 mW and a wavelength of ranging between 300 nm and 450 nm.

5. The method of claim 1, wherein the emitting step includes using a laser apparatus to emit a beam, the laser apparatus comprising:
    a laser having a power output ranging between 100 mW and 1000 mW and a wavelength ranging between 300 nm and 450 nm;
    a plurality of lenses directing the beam emitted by the laser onto the optical fiber inserted into the ferrule; and
    a heating sleeve applied onto the ferrule to perform the heating step.

6. The method of claim 5, wherein the laser apparatus further includes a glass stopper spaced apart from an end face of the ferrule by a spacing distance ranging between 0.1 mm and 2 mm.

7. The method of claim 1, wherein the optical fiber assembly has a mean insertion loss of less than or equal to 0.25 dB at a reference wavelength of 1310 nm.

8. The method of claim 1, wherein the optical fiber assembly has a pull force of at least 4 N.

9. The method of claim 1, wherein the optical fiber comprises a cladding having a refractive index, wherein the bonding agent has a refractive index;
    wherein a difference between the refractive index of the bonding agent and the refractive index of the cladding is between 0.04 and 0.12.

10. The method of claim 9, wherein the difference between the refractive index of the bonding agent and the refractive index of the cladding is between 0.04 and 0.10.

11. An optical fiber assembly formed by:
    disposing a bonding agent in a ferrule bore of a ferrule, wherein the bonding agent has a viscosity ranging between 100 cP and 10000 cP at a temperature of about 25° C.;
    inserting an optical fiber into the ferrule bore and through the bonding agent;
    emitting a light onto the optical fiber; and
    heating at least a portion of the ferrule to at least 60° C. while the bonding agent is in the ferrule bore, wherein the heating step comprises heating an entire length of the ferrule;
    wherein the heating step and the emitting step cause at least 80% of the bonding agent that is in the ferrule to cure in a curing time of less than 1 minute and thereby secure the optical fiber to the ferrule.

12. The optical fiber assembly of claim 11, wherein the heating step is conducted simultaneously with the emitting step.

13. The optical fiber assembly of claim 12, wherein the emitting step causes the at least 80% of the bonding agent to cure in about 5 seconds.

14. The optical fiber assembly of claim 11, wherein the emitting step includes using a laser emitting a beam, the laser having a power ranging between 100 mW and 1000 mW and a wavelength of ranging between 300 nm and 450 nm.

15. The optical fiber assembly of claim 11, wherein the emitting step includes using a laser apparatus to emit a beam, the laser apparatus comprising:
    a laser having a power output ranging between 100 mW and 1000 mW and a wavelength ranging between 300 nm and 450 nm;
    a plurality of lenses directing the beam emitted by the laser onto the optical fiber inserted into the ferrule; and
    a heating sleeve applied onto the ferrule to perform the heating step.

16. The optical fiber assembly of claim 15, wherein the laser apparatus further includes a glass stopper spaced apart from an end face of the ferrule by a spacing distance ranging between 0.1 mm and 2 mm.

17. The optical fiber assembly of claim 11, wherein the optical fiber assembly has a mean insertion loss of less than or equal to 0.25 dB at a reference wavelength of 1310 nm.

18. The optical fiber assembly of claim 11, wherein the optical fiber assembly has a pull force of at least 4 N.

19. The method of claim 11, wherein the optical fiber comprises a cladding having a refractive index, wherein the bonding agent has a refractive index;

wherein a difference between the refractive index of the bonding agent and the refractive index of the cladding is between 0.04 and 0.12.

20. The method of claim 19, wherein the difference between the refractive index of the bonding agent and the refractive index of the cladding is between 0.04 and 0.10.

21. A laser assembly configured to cure a bonding agent within a ferrule bore of a ferrule, the ferrule bore having an optical fiber inserted into the ferrule bore and through the bonding agent, the laser assembly comprising:
- a laser having a power output ranging between 100 mW and 1000 mW and a wavelength ranging between 300 nm and 450 nm;
- a plurality of lenses configured to direct a laser beam emitted by the laser onto the optical fiber inserted into the ferrule; and
- a heating sleeve configured to be applied onto the ferrule to increase the temperature of the ferrule to at least 60° C., wherein the heating sleeve heats an entire length of the ferrule to at least 60° C. while the bonding agent is in the ferrule bore;
- a glass stopper configured to be positioned between the plurality of lenses and the optical fiber, wherein the glass stopper is spaced apart from an end face of the ferrule by a spacing distance ranging between 0.1 mm and 2 mm.

* * * * *